United States Patent Office 3,033,849
Patented May 8, 1962

3,033,849
MANUFACTURE OF VITAMIN $B_{12}$
Robert H. Sifferd, Joliet, Ill., assignor, by mesne assignments, to Armour and Company, Chicago, Ill., a corporation of Delaware
No Drawing. Filed May 19, 1958, Ser. No. 735,948
2 Claims. (Cl. 260—211.5)

This invention relates to the manufacture of vitamin $B_{12}$-active substances, and more particularly to the purification of vitamin $B_{12}$-active substances by treatment with an ion exchange material.

In the purification of vitamin $B_{12}$-active substances by treatment with an ion exchange material, there is conventionally employed a crude aqueous solution of vitamin $B_{12}$-active substances and contaminants thereof derived from liver tissue or from microorganisms. This crude aqueous solution of vitamin $B_{12}$-active substances and contaminants thereof is contacted with a cation exchange material such as a carboxylic acid ion exchange resin, e.g. Amberlite IRC-50 or Rohm and Haas XE-97, to adsorb at least a portion of the vitamin $B_{12}$-active substances thereon. Then at least a portion of the contaminant substances are selectively eluted from the resulting adsorbate by treatment with a dilute aqueous acid solution or a mixture of water and, for example, acetone. After selectively eluting the contaminant substances, the vitamin $B_{12}$-active substances are eluted from the adsorbate by treatment with a dilute aqueous acid solution containing a water-miscible polar organic solvent.

The term "vitamin $B_{12}$-active substances" employed herein refers to cobalamin derivatives, such as cyanocobalamin (vitamin $B_{12}$), hydroxycobalamin, sulfitocobalamin, sulfatocobalamin, chlorocobalamin, etc.

It has been found that at least a portion of the vitamin $B_{12}$-active substances contained in the crude aqueous solution of vitamin $B_{12}$-active substances and contaminants thereof derived, especially, from microorganisms is in the hydroxy form, i.e. hydroxycobalamin. This hydroxycobalamin is relatively unstable, and upon adsorption on the cation exchange material there is a tendency for the hydroxycobalamin to be destroyed during the steps of eluting the contaminant substances and eluting the purified vitamin $B_{12}$-active substances. I have discovered that this destruction of the hydroxycobalamin while adsorbed on the cation exchange material can be prevented by conversion thereof to the relatively stable sulfito form, i.e. sulfitocobalamin. This conversion of the hydroxycobalamin to sulfitocobalamin may be achieved by contacting the adsorbate consisting of vitamin $B_{12}$-active substances and contaminants thereof adsorbed on the cation exchange material with a dilute aqueous solution of sulfurous acid having a pH of less than 2.5. When this conversion of the hydroxycobalamin to sulfitocobalamin is obtained after producing the initial adsorbate of vitamin $B_{12}$-active substances and contaminants thereof and the cation exchange material, the subsequent elution of contaminant substances and of the vitamin $B_{12}$-active substances can be achieved without significant destruction of vitamin $B_{12}$ activity.

After selectively eluting the sulfitocobalamin from the anion exchange material, it can be converted to cyanocobalamin by treating the eluate with cyanide ion at a pH of at least 7.0. Furthermore, it has been surprisingly discovered that the adsorbate of sulfitocobalamin on the cation exchange material can be converted to a therapeutically desirable cobalamin derivative by contacting such adsorbate with a dilute aqueous solution of hydrogen cyanide at a pH of less than 2.5. The exact nature of this conversion product is not as yet known. However, the spectrophotometric absorption spectra of such product does not resemble that of cyanocobalamin or sulfitocobalamin, but is is similar to that of chlorocobalamin, sulfatocobalamin and hydroxycobalamin.

In the preferred practice of this invention, a crude aqueous solution of vitamin $B_{12}$-active substances and contaminants thereof is obtained from sewage according to the procedure described in Miner and Wolnak U.S. Patent No. 2,646,386 wherein activated sewage sludge is mixed with water to obtain an aqueous extract of vitamin $B_{12}$-active substances, and wherein such aqueous extract is separated from the sewage residue to obtain a crude aqueous solution of the vitamin $B_{12}$-active substances and contaminants thereof. Then, the crude aqueous solution of vitamin $B_{12}$-active substances and contaminants thereof is adjusted to a pH of less than 2.5.

The purification of the vitamin $B_{12}$-active substances by ion exchange treatment can be carried out in either a batch or column operation. In the batch operation, the cation exchange material is combined with the crude aqueous concentrate of vitamin $B_{12}$-active substances and contaminants thereof in a suitable vessel. After mixing to assure intimate contact between the cation exchange material and the crude aqueous extract of vitamin $B_{12}$ and to adsorb at least a portion of the vitamin $B_{12}$-active substances on the cation exchange material, the adsorbed liquor is separated from the resulting adsorbate by, for example, centrifugation or decantation. The separated adsorbate can be mixed with a dilute aqueous solution of sulfurous acid having a pH of less than 2.5 to obtain conversion of the hydroxycobalamin contained therein to sulfitocobalamin. After separating the resulting adsorbed liquor from the sulfitocobalamin adsorbate, the contaminant substances can be selectively eluted by treatment of the adsorbate with a mixture of water and, for example, acetone. After completing the selective elution of contaminant substances, the sulfitocobalamin can be eluted from the adsorbate by treatment with an aqueous solution having a pH of less than 2.5 and containing a polar organic solvent being at least partially miscible in water, such as methyl ethyl ketone. The column operation is carried out in a similar fashion, except that a mass of the cation exchange material is disposed in the form of a vertical cylinder to form a columnar ion exchange bed, and thereafter the various solvents and solutions are passed downwardly through the ion exchange bed by gravitational flow to achieve intimate contact with the cation exchange material.

It will be apparent that an excess of the sulfurous acid may be employed in the conversion of the hydroxycobalamin to sulfitocobalamin on the cation exchange material. However, the conversion of hydroxycobalamin adsorbed on the cation exchange material to sulfitocobalamin can be achieved with a relatively minute concentration of sulfurous acid, e.g. 0.01 M. Although this conversion may be obtained in a dilute aqueous solution having a pH less than 2.5, it is desirable to prevent destruction of the vitamin $B_{12}$ by employing a pH above about 1.5. Especially desirable results are obtained at a pH of from about 1.7 to 2.3.

The water-miscible, oxygen-containing organic solvent employed in selectively eluting vitamin $B_{12}$-contaminants according to the aforementioned washing procedure may have less than 5 carbon atoms. For example, this organic solvent may be ethanol, methanol, propanol, isopropanol, butanol, tertiary butyl alcohol, etc. Better results can be obtained with an aqueous wash solution containing acetone at a concentration of at least 75% by volume. The elution of vitamin $B_{12}$ contaminants may be further enhanced when acetone is included in the aqueous solution at a concentration of from 80 to 95% by volume, and especially desirable elution is achieved at an acetone content of about 85%.

Although elution of vitamin $B_{12}$ active substances from the special ion exchange resin may be obtained with any of the hereinbefore mentioned water-miscible oxygen-containing organic solvents at an acid pH, I have found that substantially quantitative recovery of the vitamin $B_{12}$ active substances, in high purity, can be obtained with an aqueous acid solution saturated with methyl ethyl ketone, i.e. about 28% by volume of methyl ethyl ketone having a pH of less than 2.5. This eluant solution should have a pH within the critical range hereinbefore specified in connection with the aqueous acidic solutions employed in adsorbing vitamin $B_{12}$-active substances on the ion exchange resin.

This invention can be further illustrated by the following specific example:

*Example*

The following exemplifies the volume ratios employed in the ion exchange fractionation of vitamin $B_{12}$ active substances utilizing a cationic exchange resin having a wet particle size of about 100–150 mesh:

The ion exchange resin can be packed into a glass column having a diameter of 3.0 inches and a height of 24 inches. A column having these dimensions may contain about 2500 cc. of the ion exchange resin. An aqueous solution of vitamin $B_{12}$-active substances, in the amount of 3 l., containing about 7% of total solids and 2.6 mcg. of vitamin $B_{12}$-active substances per ml., can be infused into the resin bed at a rate of about 6 ml. per minute. The effluent can be discarded, and there may be introduced into the column approximately 1.5 l. of an aqueous solution of sulfurous acid, also containing sulfuric acid and adjusted to a pH of about 1.5. Then, the resin bed may be washed with the following solutions in the specified sequence:

(1) 2 l. of a 0.1 N mineral acid solution.
(2) 1.5 l. of an aqueous 85% acetone solution.
(3) 1.51 l. of a 0.1 N mineral acid solution.

The washed resin can be eluted with an aqueous 60% dioxane solution containing 0.1 N of mineral acid. The eluate portion in the amount of 250 ml., can be collected for further purification or packaged for commercial use. To achieve an eluate portion of 250 ml. the total eluant employed may be about 500 ml.

While in the foregoing specification various embodiments of this invention have been illustrated in considerable detail for the purpose of illustration, it will be apparent to those skilled in the art that this invention is susceptible to other embodiments and that many of these details can be varied widely without departing from the basic concept and spirit of the invention.

I claim:
1. In a process for purifying vitamin $B_{12}$-active substances, the steps of contacting with a carboxylic acid ion exchange resin an aqueous solution of vitamin $B_{12}$-active substances and contaminants thereof containing at least a portion of hydroxycobalamin and having a pH of less than 2.5 to adsorb at least a portion of the vitamin $B_{12}$-active substances thereon, contacting the resulting adsorbate with a dilute aqueous solution of sulfurous acid having a pH of less than about 2.5 to convert at least a portion of the adsorbed hydroxycobalamin to sulfitocobalamin, then contacting the adsorbate with a mixture of water and acetone to selectively elute at least a portion of the contaminant substances, and thereafter contacting the adsorbate with an aqueous solution having a pH of less than 2.5 and containing a water-miscible polar organic solvent to elute the vitamin $B_{12}$-active substances.

2. In a process for purifying vitamin $B_{12}$-active substances, wherein microorganisms derived from sewage are treated to obtain a crude aqueous extract of vitamin $B_{12}$-active substances at least a portion of which vitamin $B_{12}$-active substances are in the form of hydroxycobalamin, the steps of adjusting said crude aqueous extract of vitamin $B_{12}$-active substances to a pH of less than 2.5, then contacting with a cation exchange material the crude aqueous extract of vitamin $B_{12}$-active substances to adsorb at least a portion of the vitamin $B_{12}$-active substances thereon, contacting the resulting adsorbate with a dilute aqueous solution of sulfurous acid having a pH of from about 0.5 to 2.0 to convert at least a portion of the adsorbed hydroxycobalamin to sulfitocobalamin, then contacting the adsorbate with a mixture of water and acetone to selectively elute at least a portion of the contaminant substances adsorbed thereon, and thereafter contacting the adsorbate with an aqueous solution having a pH of from about 1.7 to 2.3 and containing a water-miscible polar organic solvent to elute the vitamin $B_{12}$-active substances.

References Cited in the file of this patent

UNITED STATES PATENTS

| | | |
|---|---|---|
| 2,694,679 | Holland et al. | Nov. 16, 1954 |
| 2,702,263 | Shafer et al. | Feb. 15, 1955 |
| 2,721,162 | Fricke | Oct. 18, 1955 |
| 2,830,933 | Bouchard et al. | Apr. 15, 1958 |
| 2,893,989 | Bernhauer | July 7, 1959 |
| 2,914,524 | Ziegler | Nov. 24, 1959 |

FOREIGN PATENTS

| | | |
|---|---|---|
| 763,608 | Great Britain | Dec. 12, 1956 |